United States Patent

Herbert et al.

[11] Patent Number: 5,968,353
[45] Date of Patent: Oct. 19, 1999

[54] CLARIFIER WITH SLUDGE DEWATERING

[75] Inventors: Richard P. Herbert, Lanbsbaurgh; William A. Gero, Pittsfield, both of Mass.

[73] Assignee: Beloit Technologies, Inc., Wilmington, Del.

[21] Appl. No.: 08/971,173

[22] Filed: Nov. 14, 1997

[51] Int. Cl.[6] .............................. C02F 1/24; B01D 21/18; B01D 29/64; B01D 36/04
[52] U.S. Cl. .................... 210/221.3; 210/295; 210/298; 210/406; 210/413; 210/523; 210/526; 210/540
[58] Field of Search ................. 210/221.2, 776, 210/413, 703, 540, 525, 406, 541, 295, 298, 526, 523

[56] References Cited

U.S. PATENT DOCUMENTS

| | | |
|---|---|---|
| 2,705,562 | 4/1955 | Albertson . |
| 3,087,620 | 4/1963 | Hirs . |
| 3,175,687 | 3/1965 | Jones . |
| 3,221,885 | 12/1965 | Hirs . |
| 3,332,556 | 7/1967 | Hirs . |
| 3,865,727 | 2/1975 | Broling . |
| 4,071,451 | 1/1978 | Wood . |
| 4,192,747 | 3/1980 | Wykoff . |
| 4,243,537 | 1/1981 | Leonard . |
| 4,389,315 | 6/1983 | Crocket . |
| 5,268,100 | 12/1993 | Hartzell . |
| 5,565,099 | 10/1996 | Faurel et al. . |
| 5,662,804 | 9/1997 | Dufour . |

FOREIGN PATENT DOCUMENTS

| | | |
|---|---|---|
| 2684020 | 5/1993 | France . |
| 2513972 | 10/1976 | Germany . |
| 3927881A1 | 8/1990 | Germany . |
| 56-45774 | 4/1981 | Japan . |

OTHER PUBLICATIONS

"White Water DAF Clarifier—Tissue Machine Project" no date some text blacked out.

*Primary Examiner*—Thomas M. Lithgow
*Attorney, Agent, or Firm*—Lathrop & Clark LLP; Raymond W. Campbell

[57] ABSTRACT

A rectangular clarifying tank has an inclined beach formed of sheet metal and having 575 holes per square inch, each hole having a diameter of 20 thousandths of an inch. Two side chain drives advance several scrapers along the beach. Each scraper has a rotatable knurled pipe which turns the sludge and aids dewatering through the beach. The sludge removed from the clarifier has a solids content of between eight and twelve percent. Additional dewatering may be accomplished by applying a vacuum to the last one-quarter of the beach. A tray positioned beneath the beach collects water which drains through the beach. The drain water may be returned to the clarifier tank or may be directly treated as clarified water.

17 Claims, 2 Drawing Sheets

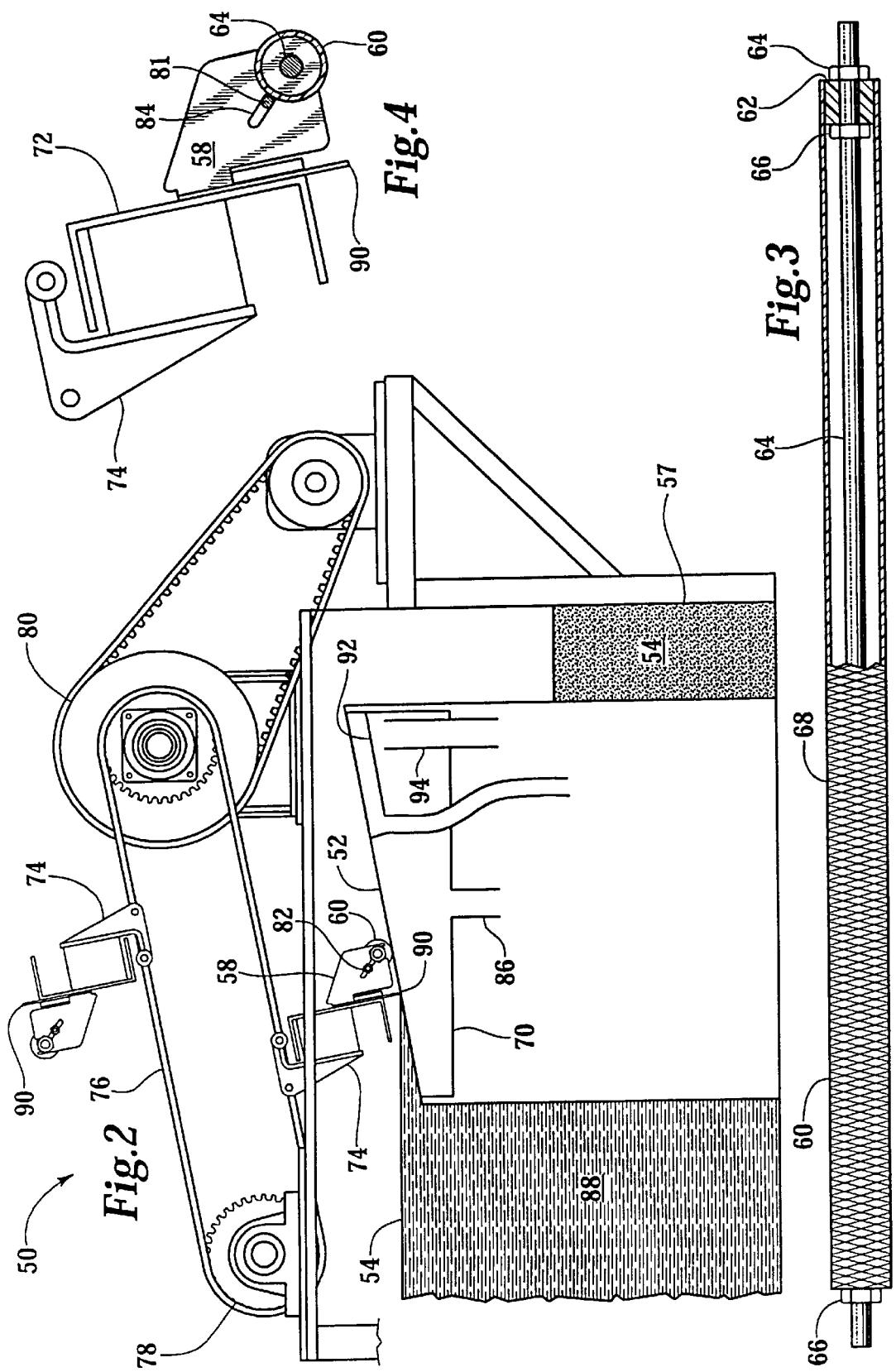

CLARIFIER WITH SLUDGE DEWATERING

FIELD OF THE INVENTION

The present invention relates to apparatus for removing particles from suspension in water in general, and to clarifiers using dissolved air in particular.

BACKGROUND OF THE INVENTION

Water containing suspension solids must be processed to remove substantially all the suspended material before it is discharged to the environment. Equally important costs of water intensive industrial processes can be significantly reduced if suspended solids can be removed from water and the water reused. One cost effective way of removing solids from water is to place the water in a holding tank or pond and allow gravity to act upon the denser solids over time. However, if the suspended solid material has nearly the density of water the process can take too long to be practical. The time considerations can be particularly acute in manufacturing processes which require a continuous flow of great quantities of water, such as papermaking. The manufacture of a single ton of paper may require hundreds of tons of water. Hence, in the modern world, wastewater recycling is critical to manufacturing a cost competitive product.

One widely used technique to remove suspended solids in situations where the solids have a density close to that of water is to inject micro air bubbles into the water containing the dissolved solids. The micro bubbles become attached to the suspended solids and cause them to float to the surface of a container where they may be skimmed off. The bubbles are formed by taking a fraction, typically about 25 percent, of the flow to be clarified, and raising its pressure to about 70 psi. The pressurized water is mixed with about one percent air by volume and the air is dissolved in the water. The water containing the dissolved air is then de-pressurized by passing the water through a nozzle. The air comes out of solution as the water passes through the nozzle, thereby forming air bubbles having a diameter of 20 to 40 microns. The water with the suspended bubbles is then mixed with all the water to be clarified and injected into a rectangular tank which is typically about four to sixteen feet wide, four to ten feet deep, and twelve to thirty feet long.

Bubbles with a diameter of 20 to 40 microns rise through water at a rate of about 16 to 18 inches per minute. As the bubbles rise, they may become attached to solids suspended in the water, causing the solids to float to the top of the tank. At one end of the tank opposite the water inlet is a sloped surface or beach which extends from beneath the water surface to above the water surface terminating at a sludge containment trough. A scraper on an endless chain drags the floating sludge up the beach and into the sludge containment trough. The sludge as removed from the tank has a solid content of between four and six percent. Clarified water is removed through pipes positioned within the tank at a level about a foot from the tank bottom.

Although a conventional dissolved air clarifier is effective at producing clarified water which can be recycled or safely disposed of, the sludge must be further processed before disposal. The typical process involves further concentrating the solids until the remaining sludge can be cost effectively incinerated or composted. This typically requires additional pressing and dewatering equipment.

What is needed is a dissolved air clarifier which produces sludge with significantly higher solids content.

SUMMARY OF THE INVENTION

The clarifier of this invention has a rectangular clarifying tank with an inclined beach formed of perforated thin gauge plate. A rotatable knurled plastic pipe is mounted on a scraper which is urged along the beach on a continuous chain. The knurled pipe turns the sludge and aids dewatering through the beach. The sludge removed from the clarifier has a solids content of between eight and twelve percent. Additional dewatering may be accomplished by applying a vacuum to the last one-quarter of the beach. The plate forming the beach is constructed of 28 gauge sheet metal and has 575 holes per square inch, each hole having a diameter of 20 thousandths of an inch. A tray positioned beneath the beach collects water which drains through the beach. The drain water may be returned to the clarifier tank or may be directly treated as clarified water.

It is a feature of the present invention to provide a clarifier which produces sludge of a higher solids content.

It is another feature of the present invention to provide a clarifier which is more economical to operate.

It is a further feature of the present invention to provide a clarifier which allows the elimination of processing equipment for dewatering sludge.

Further objects, features and advantages of the invention will be apparent from the following detailed description when taken in conjunction with the accompanying drawings.

BRIEF DESCRIPTION OF THE DRAWINGS

FIG. 2 is a side elevational cross-sectional view of a clarifier beach and scraper of this invention.

FIG. 3 is a front elevational view, partially cut away of the roll of FIG. 1

FIG. 4 is a detail view, partly cutaway of the scraper of FIG. 2.

DESCRIPTION OF THE PREFERRED EMBODIMENT

Figure 1:
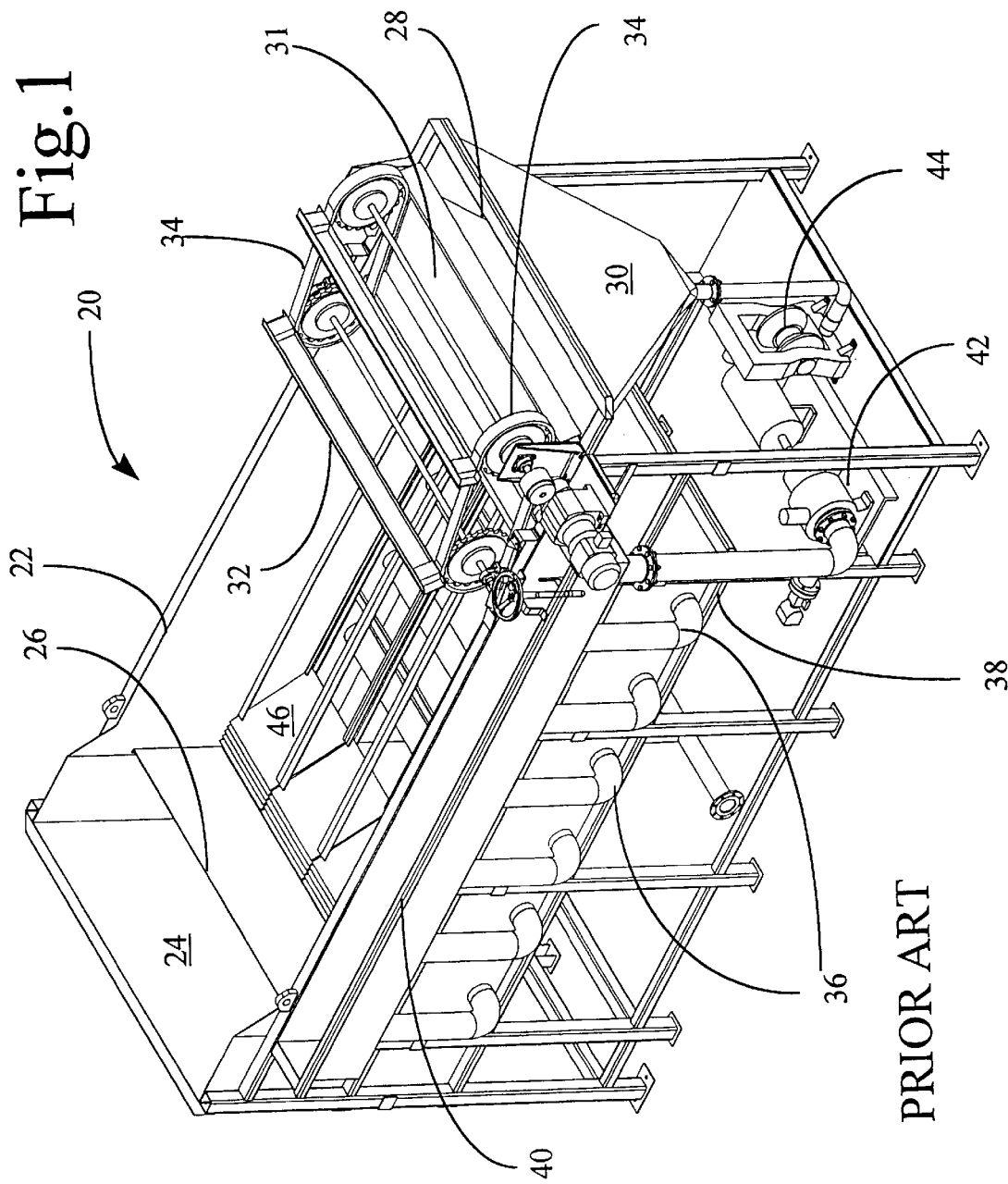
FIG. 1 is an isometric view of a prior art clarifier.

Referring more particularly to FIGS. 1–4, wherein like numbers refer to similar parts, a conventional clarifier 20 is shown in FIG. 1. The clarifier 20 is of a type sold by Beloit Corporation, of Beloit, Wis. Waste water is introduced into the rectangular tank 22 of the clarifier 20 through an upwardly extending waste water inlet 26 at an inlet side 24. Some solid material settles out of the water within the clarifier tank, while micro bubbles are introduced through the tank bottom to float solids to the surface of the liquid. A plurality of scrapers 32 mounted on two endless chains 34 drag sludge up a sloped beach 31 and into the sludge discharge chute 30 at the sludge discharge end 28 of the tank. The sludge removed by the scrapers 32 in the prior art clarifier 20 has a solids content of between four and six percent. Pipes 36 along the bottom 38 of the tank 22 flows to a clarified water trough 40 from which clarified water is pumped by a pump 42. The clarified water is then recycled or dispose of. A sludge transfer pump 44, typically of the diaphragm type, communicates with the sludge discharge chute 30 and transfers the sludge for further processing and disposal. The lower portion of the tank 22 is shown partly filled with Lamella plate 46. For greater visibility, in FIG. 1 only a portion of the plates have been shown. The plates 46 are used to improve settling.

An improved clarifier 50 of this invention, shown in FIG. 2, is similar in overall design to the clarifier 20 shown in FIG. 1. The present invention differs in the design of the sludge removal system and in the absence of the Lamella plate. An improved beach 52 is constructed from foraminous twenty-eight gauge stainless steel having five-hundred-andseventy-five holes per square inch, each hole being approximately twenty-thousandths of an inch in diameter. Sludge 54 is dragged up the beach 52 by chain-driven scrapers 56 and dumped into a sludge discharge chute 57.

The improved clarifier 50 produces sludge 54 which has a solids content of between eight and twelve percent. This sludge is then suitable for processing by a screw press or the like. Because of the higher solids content, an entire step of dewatering such as by gravity screens, may be eliminated, thereby significantly reducing required equipment and attendant costs.

The scraper 56 has side brackets 58 which are mounted to spaced parallel drive chains. The brackets 58 support a knurled pipe 60, shown in FIG. 4, allowing it to extend in a cross-machine direction across the beach. The knurled pipe 60 is mounted by bushings 62 to a stainless steel rod 64. The pipe may be constructed of plastic, stainless steel or other suitable material. Nuts 66 position the pipe 60 and bushings 62 on the rod 64. The nuts 66 are bonded with Loctite® so the pipe 60 turns freely on the rod 64. The knurled surface 68 of the pipe 60 serves to better disrupt the sludge 54 and facilitate draining of water from the sludge through the beach 52 into a drain pan 70.

The side brackets 58 and the pipe 60 may be constructed of polyvinyl chloride (PVC) or other suitable material, such as stainless steel, and are attached to a C-channel 72 constructed of the same material. The C-channel is mounted to two chain brackets 74 which are fastened to a pair of chains 76, one on either side of the beach. Again the chain may be constructed of plastic, stainless steel or other suitable material. Each chain is looped between a lower sprocket wheel 78 and an upper sprocket wheel 80. The chains 76 are driven in tandem to advance a scraper 56 along the beach approximately once a minute. The pipe 60 support brackets 58 also support a wire 81 attached to a bracket 82 in slot 84 for adjustment. The wire is spaced from the surface 68 of the pipe 60 and serves to separate excess sludge from the surface 68 of the pipe 60.

Water is removed from the drain pan 70 through a drain 86. The water which passes through the foraminous beach 52 may be treated as clarified water or may be returned to the clarifier tank 88 depending on the feed material and the size of the holes in the beach 52.

A hard Neoprene® blade 90 extends downwardly from the C-channel 72 to engage and scrape the upwardly facing surface 92 of the beach 52. The clarifier 50 produces sludge having a solids content of eight to twelve percent or greater, thus allowing the sludge to bypass a gravity screen and go directly to a screw press or the like.

The clarifier 50 may be provided with a vacuum box 92 along the last one-quarter of the length of the beach 52. The vacuum box 92 can further dewater sludge before it is pushed into the sludge discharge chute 57.

A further variation of the clarifier 50 has an overflow drain 94 which allows water to flow under gravity back to the tank 88.

It should be understood that the size of the clarifier tank will depend on the volume of water being processed. Certain parameters of the clarifier 50 such as the number and diameter of the holes in the beach 52 will be variable depending upon the type of water being clarified and the contaminants contained in the water.

It should also be understood that if water containing significant quantities of useful fiber is processed, the sludge may be recycled to utilize the fiber contained in the sludge.

It is understood that the invention is not limited to the particular construction and arrangement of parts herein illustrated and described, but embraces such modified forms thereof as come within the scope of the following claims.

We claim:

1. A clarifier for extracting sludge from waste water comprising:

an upwardly opening tank having an inlet end and a sludge discharge end, wherein waste water containing solids is introduced into the tank at the inlet end;

an inclined foraminous beach adjacent the tank discharge end, a portion of the beach extending above the level of waste water within the tank;

at least one scraper which extends in a cross machine direction across the beach, and which is advanced toward the discharge end; and a pipe rotatably mounted to the scraper to move sludge along the beach to facilitate water drain through the beach as sludge is advanced to a sludge discharge.

2. The clarifier of claim 1 wherein the beach is perforated with approximately 575 holes per square inch, each hole having a diameter of about 20 thousandths of an inch.

3. The clarifier of claim 1 wherein a vacuum box is disposed beneath a portion of the beach to draw water through the perforations in the beach and aid the dewatering of the sludge being advanced thereover.

4. The clarifier of claim 3 wherein the vacuum box is positioned to draw a vacuum on approximately the last one quarter of the beach as it extends in a machine direction.

5. The clarifier of claim 1 wherein two looped chains are positioned one on each side of the beach, and wherein a bracket is affixed to each chain, and the scraper extends between the two brackets.

6. The clarifier of claim 5 further comprising:

a C-channel extending between the two brackets upstream of the scraper; and a blade extending downwardly from the C-channel into engagement with the beach.

7. The clarifier of claim 1 further comprising a wire positioned adjacent to the pipe to prevent buildup of sludge on the pipe.

8. The clarifier of claim 1 wherein the pipe has a surface which is knurled.

9. A clarifier for extracting sludge from waste water comprising:

an upwardly opening tank having an inlet end and a sludge discharge end, the tank containing waste water having solids suspended therein;

an inclined foraminous beach adjacent the sludge discharge end, a portion of the beach extending below the level of the waste water within the tank;

at least one scraper which extends in a cross machine direction across the beach, and which is movable toward the discharge end; and a tray disposed beneath at least a portion of the beach, the tray positioned to collect water which drains through perforations in the beach; and a pipe rotatably mounted to the scraper to move sludge along the beach to facilitate water drainage through the beach as sludge is advanced to a sludge discharge.

10. The clarifier of claim 9 wherein the pipe has a surface which is knurled.

11. A clarifier for extracting sludge from waste water comprising:

an upwardly opening tank having an inlet end and a sludge discharge end, wherein waste water containing solids is introduced into the tank at the inlet end;

an inclined foraminous beach adjacent the tank discharge end, a portion of the beach extending above the level of waste water within the tank;

at least one scraper which extends in a cross machine direction across the beach, and which is movable toward the discharge end; and a vacuum box disposed beneath a portion of the beach to draw water through the perforations in the beach and aid the dewatering of the sludge being advanced thereover; and a pipe rotatably mounted to the scraper to move sludge along the beach to facilitate water drainage through the beach as sludge is advanced to a sludge discharge.

12. The clarifier of claim 11 further comprising a wire positioned adjacent to the pipe to prevent buildup of sludge on the pipe.

13. The clarifier of claim 11 wherein the pipe has a surface which is knurled.

14. The clarifier of claim 11 wherein the vacuum box is positioned to draw a vacuum on approximately the last one quarter of the beach as it extends in a machine direction.

15. The clarifier of claim 11 wherein two looped chains are positioned one on each side of the beach, and wherein a bracket is affixed to each chain, and the scraper extends between the two brackets.

16. The clarifier of claim 15 further comprising:

a C-channel extending between the two brackets upstream of the scraper; and a blade extending downwardly from the C-channel into engagement with the beach.

17. A clarifier for extracting sludge from waste water comprising:

an upwardly opening tank having an inlet end and a sludge discharge end, wherein waste water containing solids is introduced into the tank at the inlet end;

an inclined foraminous beach adjacent the tank discharge end, a portion of the beach extending above the level of waste water within the tank;

at least one scraper which extends in a cross machine direction across the beach, and which is advanced toward the discharge end; and a means for increasing water drainage through the beach mounted to the scraper.

* * * * *